No. 895,448. PATENTED AUG. 11, 1908.
F. GEHNER.
WHEEL MOUNTED PUSH SCRAPER.
APPLICATION FILED NOV. 29, 1907.
2 SHEETS—SHEET 2.
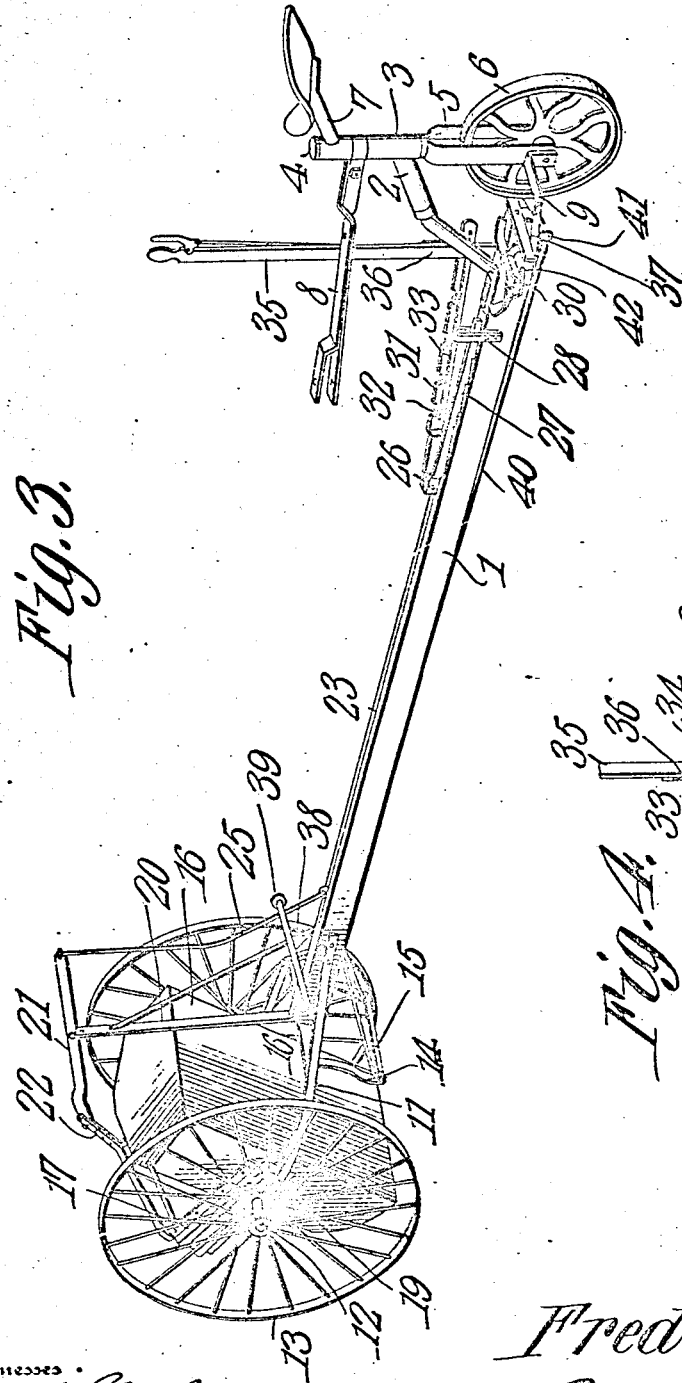
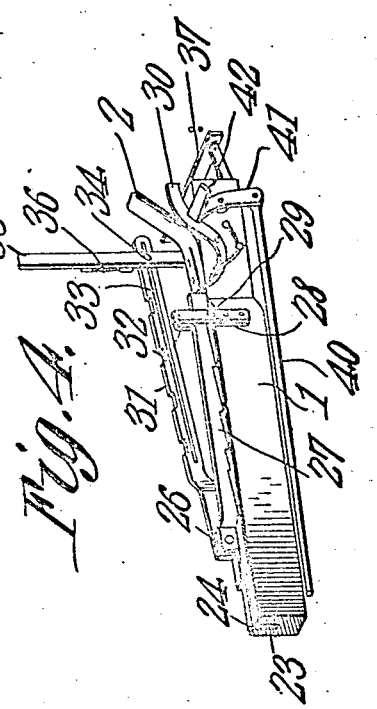
Inventor
Fred Gehner.
Witnesses
By
Attorneys

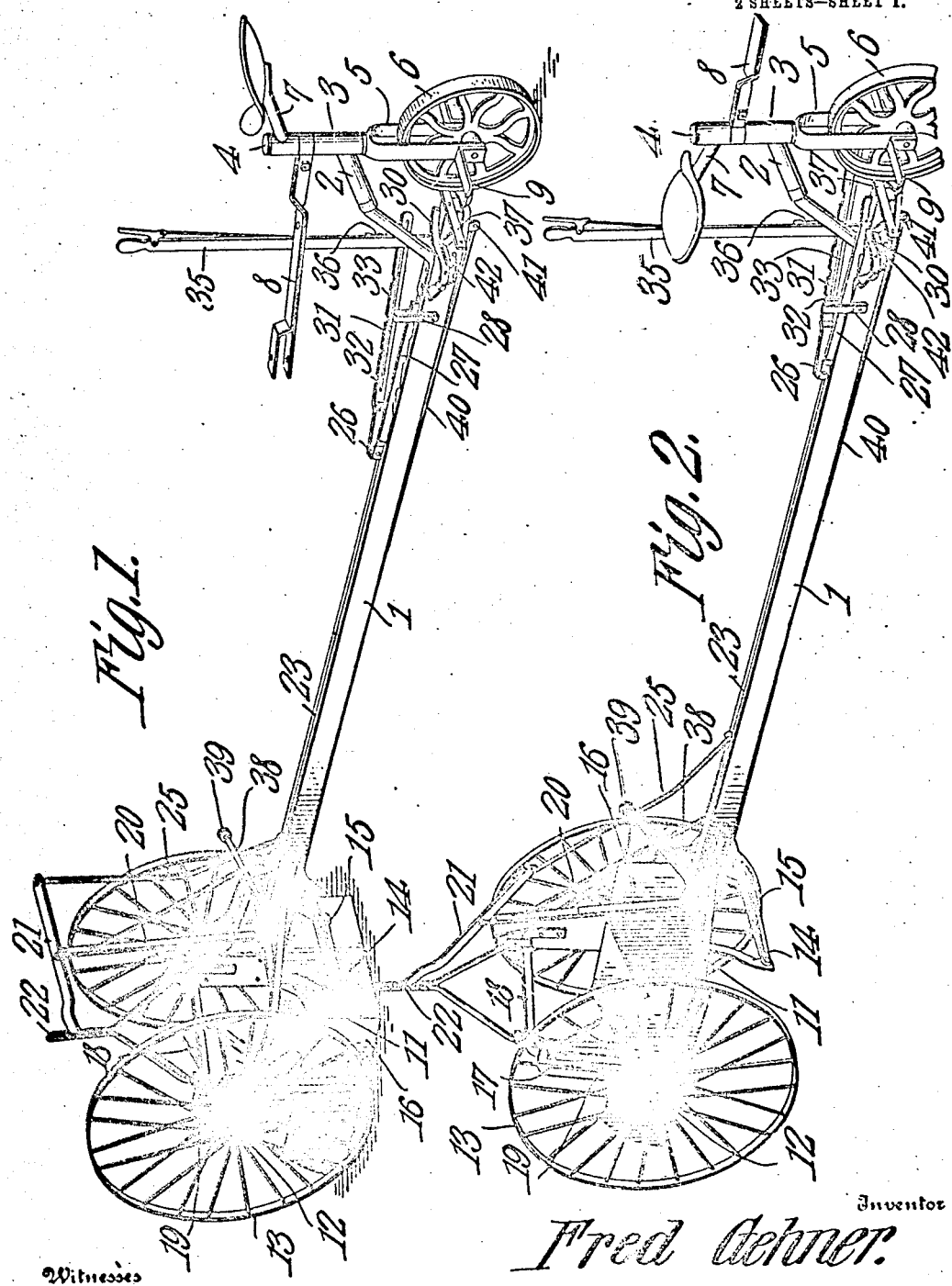

UNITED STATES PATENT OFFICE.

FRED GEHNER, OF GARRISON, NORTH DAKOTA.

WHEEL-MOUNTED PUSH-SCRAPER.

No. 895,448.

Specification of Letters Patent.

Patented Aug. 11, 1908.

Application filed November 29, 1907. Serial No. 404,400.

*To all whom it may concern:*

Be it known that I, FRED GEHNER, a citizen of the United States, residing at Garrison, in the county of McLean and State of North Dakota, have invented a new and useful Wheel-Mounted Push-Scraper, of which the following is a specification.

This invention has relation to wheel mounted push scrapers and it consists in the novel construction and arrangement of its parts as hereinafter shown and described.

The object of the invention is to provide a scraper of the character indicated adapted to be operated by horses or draft animals which follow behind the dipper of the implement when the same is being loaded and being conveyed to the dump. The parts of the implement are so arranged that when the dipper arrives at the dump and is emptied the draft animals may be wheeled around and the scraper drawn back to the point of loading.

The invention further consists of a simple and substantial arrangement of parts in a novel combination as will hereinafter appear.

Figure 1 is a perspective view of the scraper showing the dipper thereof in a lowered position. Fig. 2 is a perspective view of the scraper showing the dipper in an elevated position. Fig. 3 is a perspective view of the scraper showing the dipper in a tilted position and, Fig. 4 is a perspective view of a portion of the tongue of the scraper.

The scraper consists of the tongue 1 which is provided at one end with a bar 2 having a vertically disposed bearing 3. A spindle 4 of the fork 5 is journaled in the bearing 3 and the ground wheel 6 is journaled between the tines of the fork 5. The seat post and seat 7 are fixed to the upper end of the spindle 4 as is also the clevis 8. The fork 5 is provided with the foot rest 9. The clevis 8 is adapted to support a double tree to which the draft animals are attached in the usual manner. The forward end of the tongue 1 is attached to the yoke 11 which is provided at its forward ends with spindles 12 upon which the ground wheels 13 are journaled. The said yoke 11 is provided with a depending frame 14 which is held in rigid position with relation to the tongue 1 by the braces 15. The dipper 16 is preferably of rectangular configuration and is provided at its sides with the vertically disposed guides 17 which are connected together at their upper ends by a cross-bar 18. The guides 17 receive the blocks 19 which in turn are journaled upon the inner ends of the spindles 12. The upright 20 is mounted upon the forward end of the tongue 1 and the lever 21 is fulcrumed at the upper end of the said upright. The working end of the lever 21 is adjustably attached to the upper end of the links 22 which in turn are pivotally connected at their lower ends to the cross-bar 18.

The tongue 1 is provided in its upper side with a longitudinally disposed channel 23 in which is located a longitudinally slidable bar 24. The forward end of the bar 24 is connected with the power end of the lever 21 by the rod 25 which has pivotal connections with the said bar and said lever. The rear end of the bar 24 is provided with an upstanding lug 26 to which is pivotally attached the forward end of the ratchet bar 27. The rear portion of the bar 27 passes through a guide 28 mounted upon the tongue 1 and the ratchets of the said bar are adapted to engage a cross-pin or stop 29 located in the said guide 28. The spring actuated trip lever 30 is fulcrumed to the side of the tongue 1 and has its forward end portion lying under the bar 27 while its rear end is within convenient reach of the foot of an operator who may be seated upon the seat 7. The bar 31 is also pivotally connected at its forward end to the lug 26, said bar is provided upon its upper edge with a series of depressions 32. The bar 31 is also provided with an elongated slot 33 which receives the pin 34 mounted upon the lever 35. The lever 35 is fulcrumed to the rear end of the tongue 1 and is provided with a spring actuated pawl 36 which is adapted to enter the depressions 32 of the bar 31. The rear end of the tongue 1 is provided with a scraper 37 which is adapted to operate against the wheel 6 and keep the same free of mud. The links 38 are pivoted at intermediate points to the sides of the tongue 1 in the vicinity of the forward end thereof. The friction wheel 39 is journaled between the upper ends of the links 38 and is adapted to bear upon the rod 25. The rod 40 is pivotally connected at its forward end to the lower ends of the links 38. Said rod 40 lies under the tongue 1 and extends back to the rear end thereof where it has pivotal connection with the rocker 41 which in turn is pivoted to the side of the tongue 1. Said rocker is provided with a rest 42 which is within convenient reach of the foot of an operator who may occupy the seat 7, thus it will be seen that a scraper is provided which may be pushed toward the material as the dipper is being loaded when this is being done the dipper is in its lowermost position between the wheels 13. When the dipper is filled the operator swings the upper end of the spring pawl 35 to the rear and as the pawl 36 is in engagement with one of the depressions 32 of the bar 31 the said bar is moved bodily toward the rear which in turn moves the bar 24 longitudinally in the channel 23. The rearward movement of the bar 24 moves the rod 25 toward the rear end of the tongue 1 which movement swings the lever 21 upon its fulcrum and elevates the working end thereof. Through the instrumentality of the links 22 and the cross-bar 18 attached to the guides 17 the dipper 16 is elevated above the ground, the guides 17 moving along the blocks 10. The dipper 16 is prevented from tilting by the wheel 39 which rests upon the rod 25 when the links 38 are swung in an upward position, this is done by the operator who places his foot upon the rest 42 of the rocker 41 and swings the same so that the rod 40 is moved longitudinally which in turn swings the links 38 and holds the wheel 39 against the rod 35. As soon as the operator removes his foot from the rest 42 the reverse movement of the parts will take place as the portions of the links 38 above their pivot are heavier than the portions of the links below the pivot. To tilt or dump the dipper 16 the operator removes his foot from the rest 42 and places his foot upon the rear end of the trip lever 30 which swings the said lever and lifts the ratchet bar 27 out of contact with the pin 29. The upper end of the lever 35 is then swung forward and the bar 24 is moved longitudinally in the channel 23 toward the dipper 16. This movement brings the rod 25 into a substantially upright position which depresses the working end of the lever 21 and through the links 22 and cross-bar 18 the dipper 16 is tilted as the blocks 19 may turn with relation to the yoke 11.

After the dipper 16 is tilted as above described and is emptied of its contents the draft animals are wheeled around and the implement is drawn away from the dump. It is therefore obvious that the dipper may be pushed over an embankment or a marshy piece of ground and emptied of its contents without requiring the draft animals to go upon hazardous or objectionable spots, as the filling in may be done in advance of the animals which are then wheeled around and the implement is drawn back to the point of loading. By reason of the fact that the bar 24 is housed within the channel 23 of the tongue 1 and the rod 40 is under the tongue there are no parts about the tongue which will interfere with one of the draft animals as it steps over the tongue to make the wheel above described. Furthermore, the said parts are protected from bending and becoming otherwise mutilated by the hoofs of the animals.

Having thus described my invention, what I claim as new and desire to secure by Letters-Patent is:

1. An implement of the character described comprising a tongue, a wheel mounted dipper located at one end thereof, a wheel supporting the opposite end thereof and adapted to turn horizontally and means adapted to turn horizontally with the wheel for connecting draft animals with the implement.

2. An implement as described comprising a tongue, a wheel mounted dipper located at one end thereof, a wheel supporting the opposite end of the tongue and adapted to turn horizontally, a seat located at the end of the tongue and adapted to turn horizontally with the wheel and means for connecting draft animals to the implement, said means also being adapted to turn horizontally with said wheel.

3. An implement as described comprising a tongue, a wheel mounted dipper located at one end thereof, a vertically disposed bearing located at the opposite end of the tongue, a spindled fork having its spindle journaled in said bearing, a wheel journaled between the tines of the fork, and a clevis fixed to said spindle.

4. An implement as described comprising a tongue, a wheel mounted dipper located at one end thereof, a vertically disposed bearing located at the opposite end of the tongue, a spindled fork having its spindle journaled in said bearing, a wheel journaled between the tines of the fork, a seat fixed to the spindle and a clevis fixed to the spindle.

5. An implement as described comprising a tongue, a wheel supporting one end thereof, a yoke attached to the opposite end, wheels supporting said yoke, a dipper slidably and tiltably mounted in the yoke and means for sliding and tilting the dipper adapted to be operated from the end of the tongue opposite to that end thereof to which the yoke is attached.

6. An implement as described comprising a tongue a wheel supporting one end thereof, a yoke attached to the opposite end, wheels supporting said yoke, blocks journaled upon the yoke, a dipper having guides which receive said blocks and means for sliding the dipper along the blocks and for swinging the blocks.

7. An implement as described comprising a tongue, a wheel supporting one end thereof, a yoke attached to the opposite end thereof, wheels supporting said yoke, a frame depending from the yoke, a dipper slidably and tiltably mounted within the yoke and adapted to engage said frame and means for operating the dipper.

8. An implement as described comprising a tongue, a wheel supporting one end thereof, a yoke attached to the opposite end, wheels supporting said yoke, blocks journaled upon the yoke, a dipper having guides which receive said block, a lever supported upon the tongue and having its working end located over the dipper and being connected with the same and means for operating said lever from the wheel supported end of the tongue.

9. An implement as described comprising a tongue, a wheel supporting one end thereof, a yoke attached to the opposite end thereof, wheels supporting said yoke, a dipper slidably and tiltably mounted within the yoke, a lever supported at the yoke end of the tongue and having its working end located over the dipper and connected with the same and means for operating said lever from the wheel supported end of the tongue.

10. An implement as described comprising a tongue, a wheel supporting one end thereof, a yoke attached to the opposite end of the tongue, wheels supporting said yoke, a dipper slidably and tiltably mounted within the yoke, a lever supported at the yoke end of the tongue, links adjustably connecting the working end of said lever with the dipper and means for operating the lever from the wheel supported end of the tongue.

11. An implement as described comprising a tongue having a longitudinally disposed channel, wheels supporting the tongue, a dipper located at one end of the tongue, means located at one end of the tongue for operating the dipper, and actuating means located at the other end of the tongue and a longitudinally movable rod connecting the operating and actuating means together and being housed within the channel of the tongue.

12. An implement as described comprising a tongue, wheels supporting the same, a slidable and tiltable dipper supported at one end of the tongue, means for sliding the dipper mounted upon the tongue and actuating means located at the opposite end of the tongue and being connected with the last said means and a manually operable means located at the last said end of the tongue for holding the dipper against tilting.

13. An implement as described comprising a tongue, wheels supporting the same, a slidable and tiltable dipper located at one end of the tongue, a lever supported upon the tongue and being operatively connected with the dipper, a lever mechanism located at the opposite end of the tongue, a longitudinally movable bar attached to the lever mechanism, a rod connecting the end of said bar with the lever connected to the dipper, a link pivoted to the tongue and having a roller for engagement with said rod, a longitudinally movable rod connected to said link and a rocker pivoted to the tongue and being pivotally connected to the last said rod.

14. An implement as described comprising a tongue, wheels supporting the same, a dipper slidably and tiltably mounted at one end of the tongue, means for operating said dipper comprising in part a longitudinally movable bar, a notched bar attached to the first said bar, a guide mounted upon the tongue and having a stop, said guide receiving said notched bar, a trip pivoted to the tongue and having an end portion lying under the notched bar, a slotted bar pivoted to the first said bar and being provided upon its edge with depressions, a lever fulcrumed to the tongue and having a pin which lies within the slot of the slotted bar and a spring actuated pawl for engaging the depressions of the last said bar.

In testimony that I claim the foregoing as my own, I have hereto affixed my signature in the presence of two witnesses.

FRED GEHNER.

Witnesses:
OLE RIGG,
J. McCANN.